United States Patent [19]

Hwangbo

[11] Patent Number: 5,809,203
[45] Date of Patent: Sep. 15, 1998

[54] SELECTED SCREEN REPRODUCING METHOD FOR VIDEO COMPACT DISC REPRODUCING SYSTEM AND APPARATUS THEREOF

[75] Inventor: Sik Hwangbo, Seoul, Rep. of Korea

[73] Assignee: Daewoo Electronics Co., Ltd., Soeul, Rep. of Korea

[21] Appl. No.: 580,928

[22] Filed: Dec. 29, 1995

[30] Foreign Application Priority Data

Dec. 30, 1994 [KR] Rep. of Korea .................. 1994-39389

[51] Int. Cl.⁶ ............................. H04N 5/91; H04N 5/917; H04N 5/781; H04N 5/85
[52] U.S. Cl. ............................... 386/70; 386/111; 386/126
[58] Field of Search ...................................... 358/342, 312, 358/335; 360/9.1, 10.1; 386/6–8, 33, 68, 109, 111, 112, 125, 126, 70, 45; 348/403, 404, 405, 408

[56] References Cited

U.S. PATENT DOCUMENTS

| | | | |
|---|---|---|---|
| 4,949,187 | 8/1990 | Cohen ...................................... | 358/335 |
| 5,212,562 | 5/1993 | Ogura ...................................... | 358/338 |
| 5,351,132 | 9/1994 | Sawabe et al. .......................... | 358/342 |
| 5,371,602 | 12/1994 | Tsuboi et al. ........................... | 358/335 |
| 5,377,051 | 12/1994 | Lane et al. .............................. | 360/33.1 |
| 5,414,455 | 5/1995 | Hooper et al. .............................. | 348/7 |
| 5,446,714 | 8/1995 | Yoskio et al. ............................ | 369/48 |
| 5,450,209 | 9/1995 | Niimura et al. ........................ | 358/335 |

FOREIGN PATENT DOCUMENTS 0265 167  4/1988  European Pat. Off. .

OTHER PUBLICATIONS

MPEG "What is MPEG–2?"., 1996.

Primary Examiner—Tommy P. Chin
Assistant Examiner—David R. Vincent
Attorney, Agent, or Firm—Beveridge, DeGrandi, Weilacher & Young, LLP

[57] ABSTRACT

Disclosed is a selected screen reproducing method for a video compact disc reproducing system previously programmied by a user with the corresponding sound for the scheduled time, and to apparatus thereof. Since a specific screen data is stored while reproducing an optical disc data on which data were recorded by an MPEG method, by selecting a specific screen playback mode, the screen and the corresponding sound are periodically outputted for a predetermined time, until now after the reproducing operation of the optical disc is completed. Thus, a user can reproduce a selected specific screen and the corresponding sound again. Further, editing a selected specific screen and the corresponding sound can be performed.

3 Claims, 8 Drawing Sheets

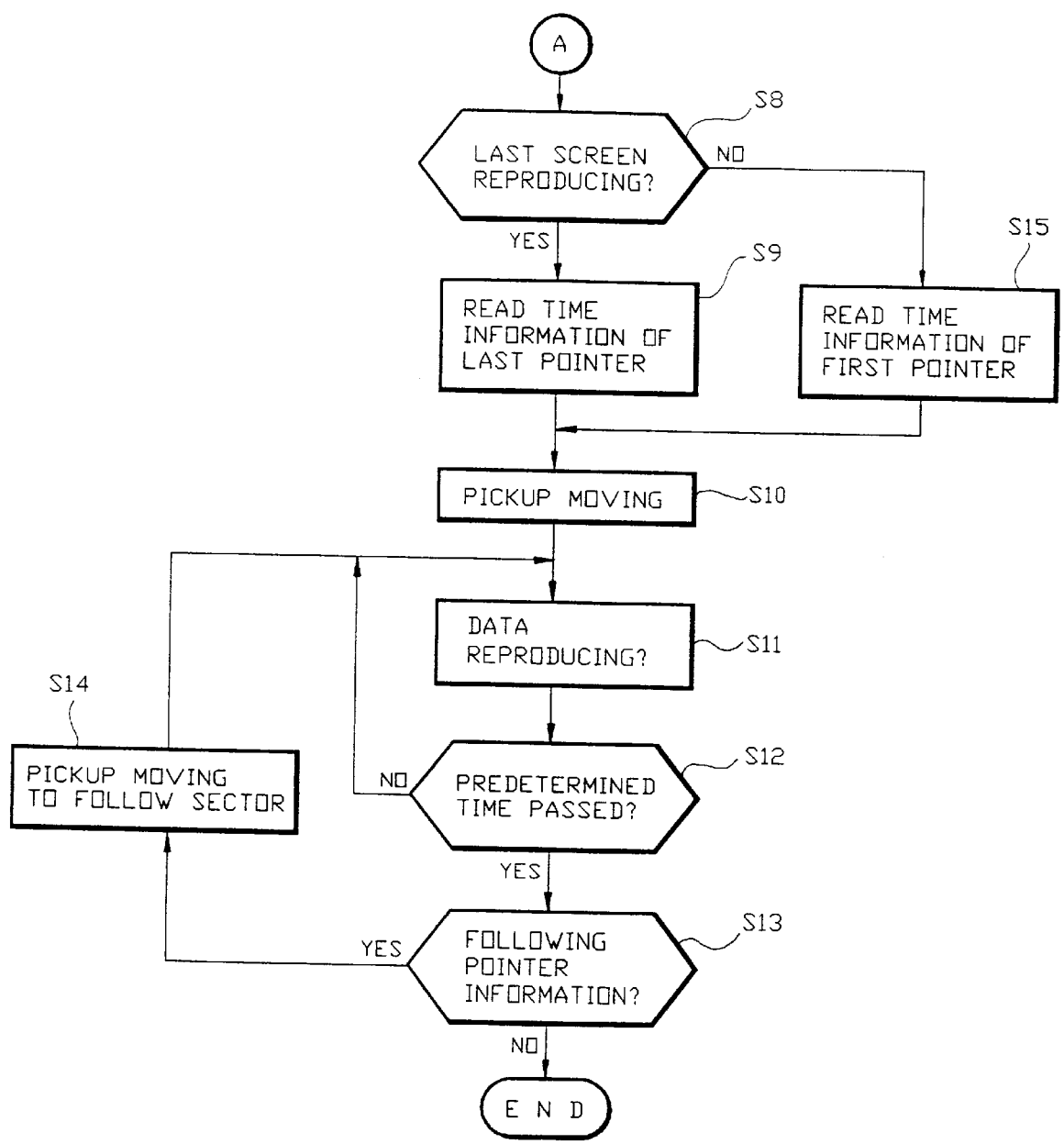

SELECTED SCREEN REPRODUCING METHOD FOR VIDEO COMPACT DISC REPRODUCING SYSTEM AND APPARATUS THEREOF

BACKGROUND OF THE INVENTION

1. Field of the Invention

The present invention relates to a video compact disc (hereinafter referred to as "V-CD") reproducing system, and more particularly, to a selected screen reproducing method for a video compact disc reproducing system previously provided by a user with the corresponding sound for the scheduled time, and to an apparatus which is suitable for performing the method.

2. Description of the Prior Art

Currently, audio/video information data are recorded on video CD using a Moving Picture Experts Group (hereinafter referred to as "MPEG") standard, which is regarded as the audio/video information recording media of a next-generation. An MPEG standard is an international standard which has been established by experts of ISO/IEC. Joint Technical Committee (JTC). By using MPEG, a motion image that is about 74 minutes long can be stored on a 12 cm diameter CD. The ISO/IEC, JTC was organized by ISO and IEC, which are international standardizing organizations for compressing and coding a digital motion image.

Referring to FIG. 1, a sector of recording data on the V-CD has a sync (12 bytes), a header (4 bytes), a sub-header (8 bytes) indicating the characteristics of the sector, user's data (2324 bytes), and an error detection code EDC (4 bytes). The user's data consists or many packs, each having an ISO 11172 layer. Each pack includes a system clock reference (hereinafter referred to as "SCR"), a system header, and many packets. A time reference point of the pack is indicated in the SCR as the number of a clock. Each packet has a packet start code and a stream recognizing code, a packet length, header data and the packet data. The header data includes a decoding time stamp (hereinafter referred to as "DTS") for indicating a decoding starting time and a presentation time stamp (thereinafter referred to as "PTS"; represented by the number of the reference clock) for indicating a show starting time.

MPEG decoder decoded packet data on the basis of control data, such as the SCR, the DTS, or the PTS, in the V-CD reproducing system for reproducng the recorded information in the V-CD recorded as described above.

MPEG video data has three kinds of basic code screen data, which are called intra picture (hereinafter referred to as "I picture") data, a predicted picture (hereinafter referred to as "P picture") data aid a bi-directional predicted picture (hereinafter referred to as "B picture") data. As shown in FIG. 3, the I picture data are obtained by compressing and coding a still screen which is a reference picture when any futher pictures are compressed and coded. That is a standard picture is needed at first for coding Differential Pulse Code Modulation (DPCM), and the I picture serves as the reference picture.

The P picture is a predicted screen, which is the predicted screen that is the nearest to the original screen from an I picture or from the P picture which has been previously generated as shown in FIG. 3.

As shown in FIG. 3, the B picture, which is also a predicted screen, may be is formed by predicting a picture in the forward direction while using the I picture and the P picture. However, the B picture may also be formed by predicting a picture in the reverse direction while using the following I picture and P picture, which composes all average picture by using the pictures predicted in the forward and the reverse direcions, and then selects the picture from these pictures which is the most similar to the orginal one.

As a displaying and decoding method of the MPEG video data having the I picture, the P picture, and the B picture, a forward reproducing mode, a forward slow speed reproducing mode, a forward high speed researching mode, and a backward high speed researching mode may be included. In the forward reproducing mode, the reproducing operation is performed at a common speed. In the forward slow speed reproducing mode, the reproducing operation is performed at a slower speed than that of the forward reproducing mode. In the forward high speed researching mode, the forward search operation is performed at a high speed. In the backward high speed researching mode, the backward search operation is performed at a high speed. U.S. Pat. No. 5,400,150, issued to Jong-Sam Woo, describes an embodiment of a selected screen reproducing method in a V-CD reproducing system.

However, in order to watch a specific screen when an optical disc is being played, the user should stop the current operation, and go back to the position of the corresponding selected screen, and then reproduce the optical disc or set the pause mode and watch in detail the screen while the optical disc is being played. In such a case, when the number of the corresponding screens is one or two, the user can easily perform the reproducing operation. However, when the number of the corresponding screens is more than two, the user will have to manually operate the disc player to perform the reproducing operation.

SUMMARY OF THE INVENTION

Therefore, a first object of the present invention is to provide a method for storing start position information of a specific screen selected by a user as needed while reprocducing a video compact disc, on which data were recorded by an MPEG algorithm, to be able to reproduce the selected screen and a corresponding sound for a predetermined time after the video compact disc is reproduced completely in a video compact disc reproducing system.

A second object of the present invention is to provide an apparatus for storing start position information of a specific screen selected by a user as needed while reproducing a video compact disc, an which data were recorded by an MPEG algorithm, to be able to reproduce the selected screen and a corresponding sound for a predetermined time after the video compact disc is reproduced completely in a video compact disc reproducing system.

In order to achieve the above-mnentioned first object of the present invention, there is provided a method for:

a) reading information data, which is recorded by an MPEG algorithm in a video compact disc, and which is being reproduced in the video compact disc reproducing system by a user's selection, to separate MPEG data and control data from the read information data;

b) judging whether or not an I picture screen data is detected from the MPEG data, and if the I picture screen data is detected, to temporarily store time information of the detected I picture screen data in a control section;

c) judging whether or not a specific screen memory mode is selected, and if the specific screen memory mode is selected, to store the time information of the temporarily stored picture screen data in a memory;

d) judging whether or not the reproducing of the video compact disc is completed, and if the reproducing operation is not completed, returning to the step a), but if the reproducing operation is completed, deciding whether or not a specific screen reproducing mode is selected; and e) reading the time information of the stored specific I picture screen data in the memory according to whether or not a last screen reproducing mode is selected, and if the specific screen reproducing mode is selected in the step d), moving the optical pickup to a corresponding position on the video compact disc based on the time information, and reproducing the selected specific screen for a predetermined time.

The method may also comprises the step of: reading the time information of a last pointer pointed to in the memory if the last screen reproducing mode is selected in the step e), to move the optical pickup to the corrsponding position on the video compact disc based on the time information, and to reproduce a last selected screen.

The method may further comprise the step of: reading the time information of a first pointer pointed to in the memory if the last screen reproducing mode is selected in the step e), to move the optical pickup to the corresponding position on the video compact disc based on the time information, and to reproduce a first selected screen.

Preferably, the method further comprises the steps of;

f) deciding whether or not the reproducing time of the selected specific screen has surpassed a predetermined time, and if the reproducing time of the selected specific screen has not surpassed the predetermined time, deciding whether or not the following pointer information is stored in the memory;

g) moving the optical pickup to a corresponding sector position of the video compact disc based on the following pointer information, if the following pointer information is stored in the memory in the step f), to reproduce a next specific screen according to the following pointer information; and h) deciding whether or not the reproducting time of the selected time screen has surpassed the predetermined time, and if the reproducing time of the selected specific screen has not surpassed the predetermined time, returning to step g), but if the reproducing time of the selected specific screen is passed as much as the predetermined time, deciding whether or not the following pointer information is stored in the memory.

In order to accomplish the above second object of the present invention, there is provided an apparatus for reproducing a selected screen in a video compact disc reproducing system, the apparatus comprising;

first means for reading MPEG audio/video data recorded on a video compact disc which is loaded in the video compact disc reproducing system to read out selected screen data from the MPEG audio/video data by user's selection;

a preamplifier for amplifying the selected screen data from the data reading means, to output an amplified signal;

a digital signal processor for processing the amplified signal from the preamplifier in the form of a serial bit stream, to output a serial bit streamed signal;

a CD-ROM decoder for decoding the serial bit streamed signal from the digital signal processor. to sample in the unit of sector, and to separate the sector unit sampled signal into an MPEG signal and a control signal;

a second means for processing an MPEG audio signal of the MPEG signal through the MPEG algorithm, to output a sound signal;

a third means for processing an MPEG video signal of the MPEG signal through the MPEG algorithm, to output an image signal;

a key input section for generating commands to control an operation menu;

a time information memory for storing the time information of the selected specific screen according to whether or not the specific screen is selected by the key input section;

a fourth means for detecting an I picture screen signal from the MPEG video s signal obtained by the third means; and a control means for temporarily storing time information of an I picture screen signal according to I picture screen signal being detected by the fourth means, to store the temporarily stored time information of an I picture screen signal to the time information memory according to whether signal or not a specific screen memory mode is selected, to control the first means based on the stored information of the time information memory according to whether or not a selection of a specific screen playback mode is selected, and to control the operation of the second means and the third means.

Preferably, the fourth means comprises:

a first shift register for receiving a picture start code, a temporal reference and a picture coding type from an MPEO video signal in the unit of a byte from the CD-ROM decoder in order, to output an output signal for picture start code, an output signal for temporal reference and an output signal for a picture cnding type data;

second and third shift registers being connected to the output terminal of the first shift register, for receiving the output signal for a picture start code and the output signal for the temporal reference from the first shift register, and to output a picture start code detecting signal and a temporal reference detecting signal, respectively;

a first logic gate for logically combining the picture start code detecting signal from the second shift register and the temporal reference detecting signal from the third shift register, to output a first picture detecting signal;

a second logic gate for logically combining the picture coding type signals from the first shift register, to output a second picture detecting signal; and a third logic gate for logically combining the first picture detecting signal from the first logic gate and the second picture detecting signal from the second logic gate, to output a picture coding type detecting signal.

Since specific screen data is stored while reproducing an optical disc data on which data were recorded by an MPEG method, by selecting a specfic screen playback mode, the screen and the corresponding sound are periodically outputted for a predetermined time, after the reproducing operation of the optical disc is completed. Thus, a user can reproduce a selected specific screen and the corresponding sound again.

BRIEF DESCRIPTION OF THE DRAWINGS

The above objects and advantages of the present invention will become more apparent by describing in detail a preferred embodiment thereof with reference to the attached drawings, in which.

Figure 1:
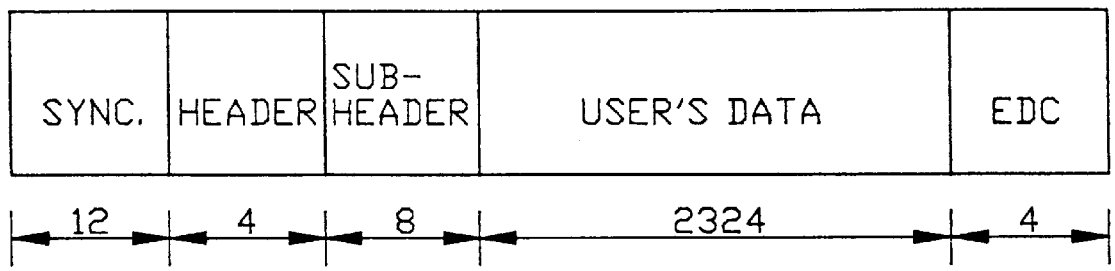
FIG. 1 is a layout for illustrating the configuration of a sector in recording data of a V-CD which is an information recording media using an MPEG method.
Figure 2:
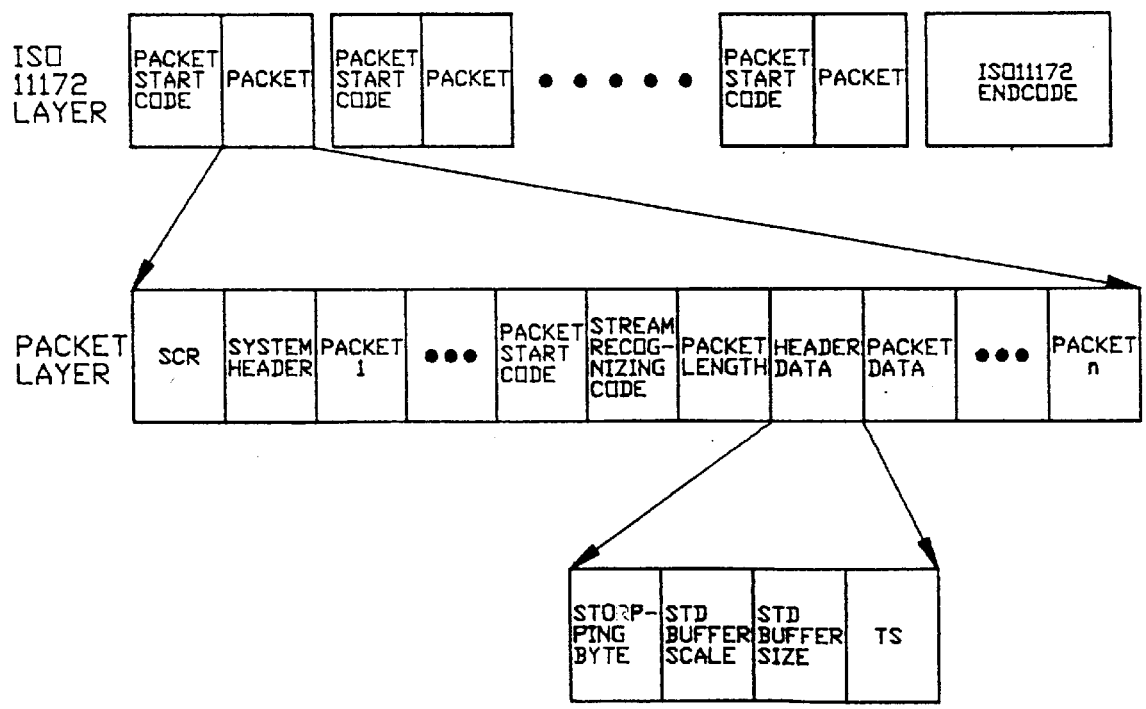
FIG. 2 illustrates the structure of the configuration of the user's data area shown in FIG. 1.
Figure 3:
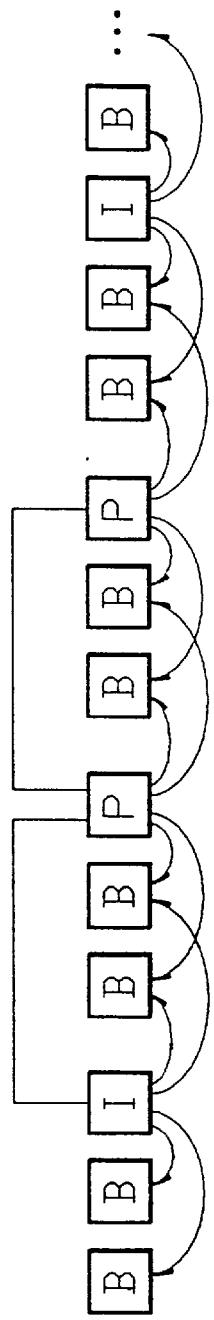
FIG. 3 is a schematic diagram for illustrating a method of predicting the I, P, and B pictures according to MPEG.
Figure 6:
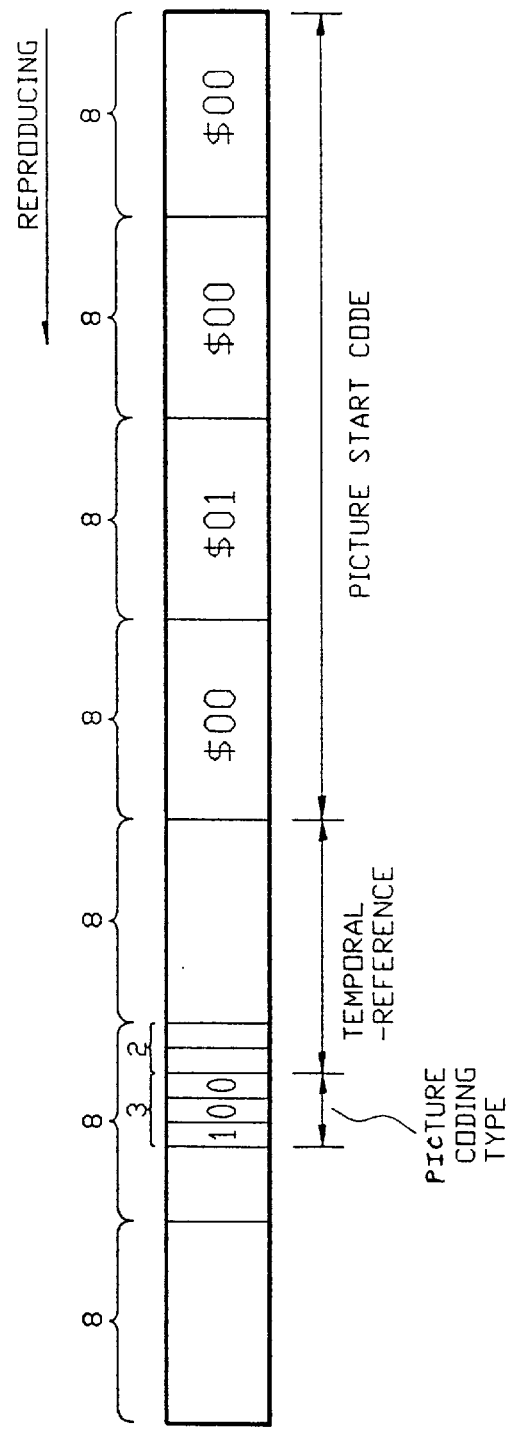
Figure 4:
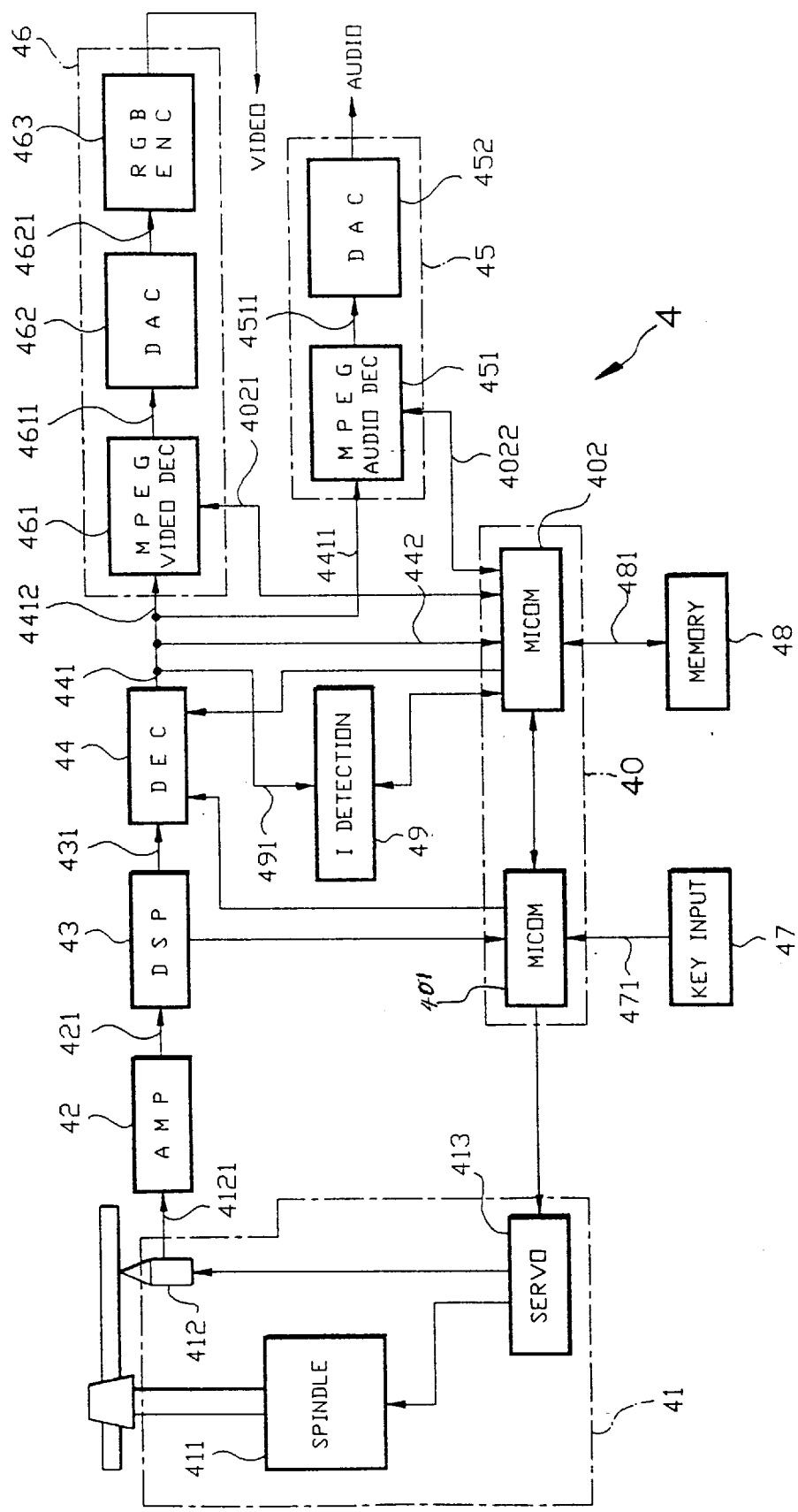
FIG. 4 is a block diagram for showing the configuration of a selected screen reproducing apparatus in the V-CD reproducing system according, to one embodiment of the present invention.
Figure 7:
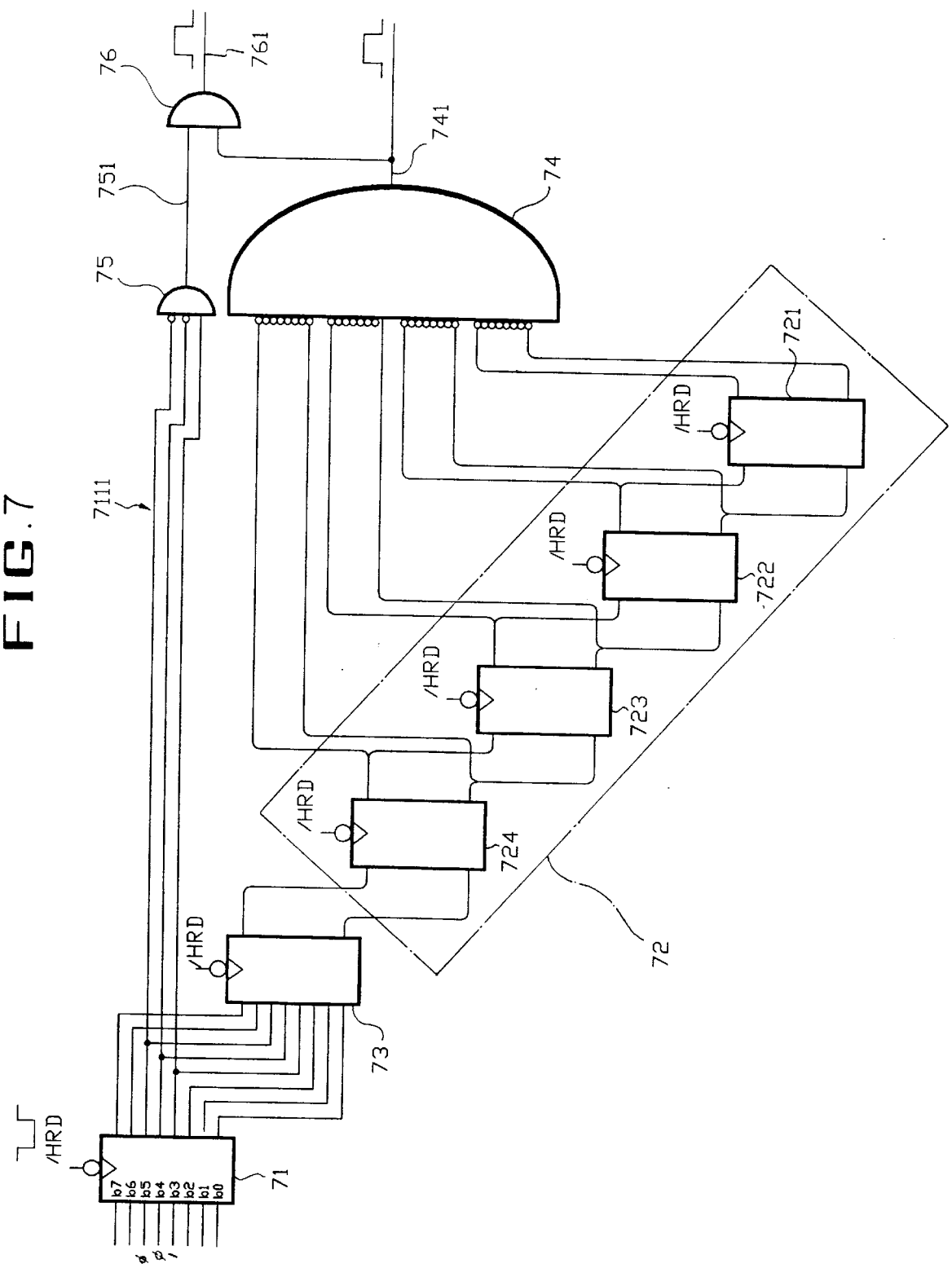
Figure 8:
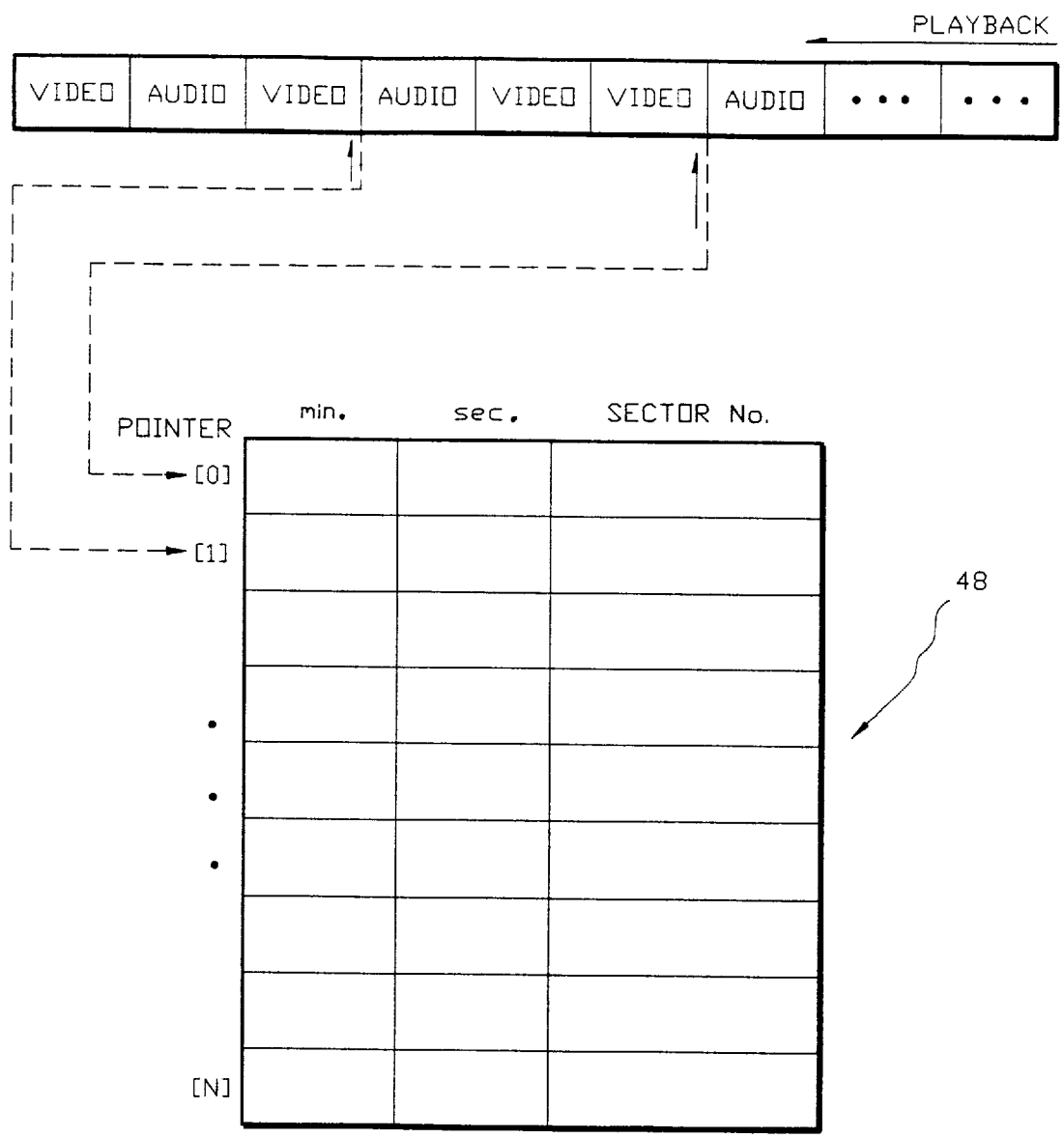
Figure 9A:
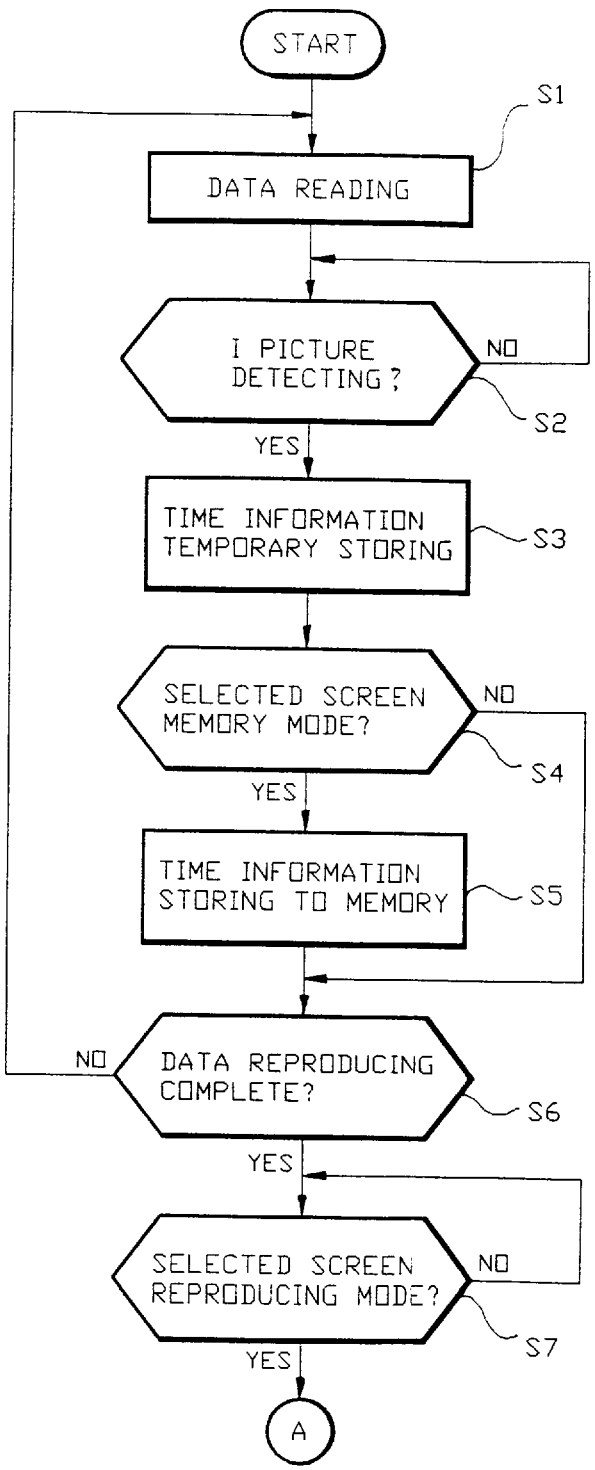

PIG. 5 is a schematic diagram of an example of a key input section shown in PIG 4;

FIG. 6 is a schematic diagram for showing a picture layer bit stream which may be used in the present invention;

FIG. 7 is a circuitry diagram for showing an example of the I picture detecting section shown in FIG. 4;

FIG. 8 is a schematic diagram for showing an example of data pattern which are stored in the time information memory shown in FIG. 4 by operating the specific screen memory key according to one embodiment of the present invention; and FIGS. 9(A) and 9(B) are a flow chart for illustrating the selected screen reproducing method in the V-CD reproducing system according to one embodiment of the present invention.

DESCRIPTION OF THE PREFERRED EMBODIMENT

A description will be given below in detail, with reference to the accompanying drawings, of the mechanical structure, the circuitry configuration, and the operation of a selected screen reproducing method for V-CD reproducing system, and of an apparatus thereof, according to an embodiment of the present invention.

As shown in FIG. 4, a reference numeral 100 represents an optical disc which is reproduced by a V-CD reproducing system. A data reading section 41 has a spindle motor 411, an optical pickup 412 and a servo circuit 413. According to an MPEG algorithm, data reading section 41 reads out MPEG audio/video data which are recorded on the V-CD and outputs audio/video data reading signal 4121 for a specific screen selected by a user among the MPEG audio/video data. Spindle motor 411 rotates the optical disc 100 at a constant speed under the control of a first micom 401 of a control section 40 (which will be described later), so that optical disc 100 is reproduced normally. Optical pickup 412 reads out information data from optical disc 100 which is rotated at a constant speed to output audio data reading signal 4121. Servo circuit 413 controls the drive of spindle motor 411 and the movements of the optical pickup 412.

A preamplifier 42 amplifes audio/video data reading signal 4121 which is supplied from optical pickup 412 of data reading section 41 and outputs amplified signal 421. DSP 43 processes amplified signal 421 from preamplifier 42, and outputs a serial bit streamed signal 431. A CD-ROM decoder 44 decodes the serial bit streamed signal 431, samples it in the sector unit, and then separately outputs the MPEG signal 441 and the control data 442 such as a SCR, a DTS, and a PTS.

An MPEG audio signal processing section 45 has an MPEG audio decoder 451 and a first D/A converting section 452. MPEG audio decoder 451 decodes MPEG atudio signal 4411 from CD-ROM decoder 44, which is synchronous with an audio synchronizing clock of about 90 kHz and outputs the decoded MPEG audio signal 4511. First D/A converting section 452 analog-converts the decoded MPEG audio signal 4511 from MPEG audio decoder 451 and outputs a sound signal.

An MPEG video sigal processing section 46 includes an MPEG video decoder 461, a second D/A converting section 462, and an RGB encoder 463. MPEG video signal processing section 46 processes MPEG video signal 4412 provided from CD-ROM decoder 44 according to an MPEG algorithm, and displays a motion image signal. Specifically MPEG video decoder 461 decodes MPEG video signal 4412 from CD-ROM decoder 44, which Is synchronized with the video synchronizing clock of about 90 kHz, and outputs MPEG video signal 4611. Second D/A converting section 462 analog-converts MPEG video signal 4611 and outputs the analog-converted MPEG video signal 4621. RGB encoder 463 converts analog-converted MPEG video signal 4621 from second D/A converting section 462 into a composite image signal 461 having R.G.B. color signals.

Figure 5:
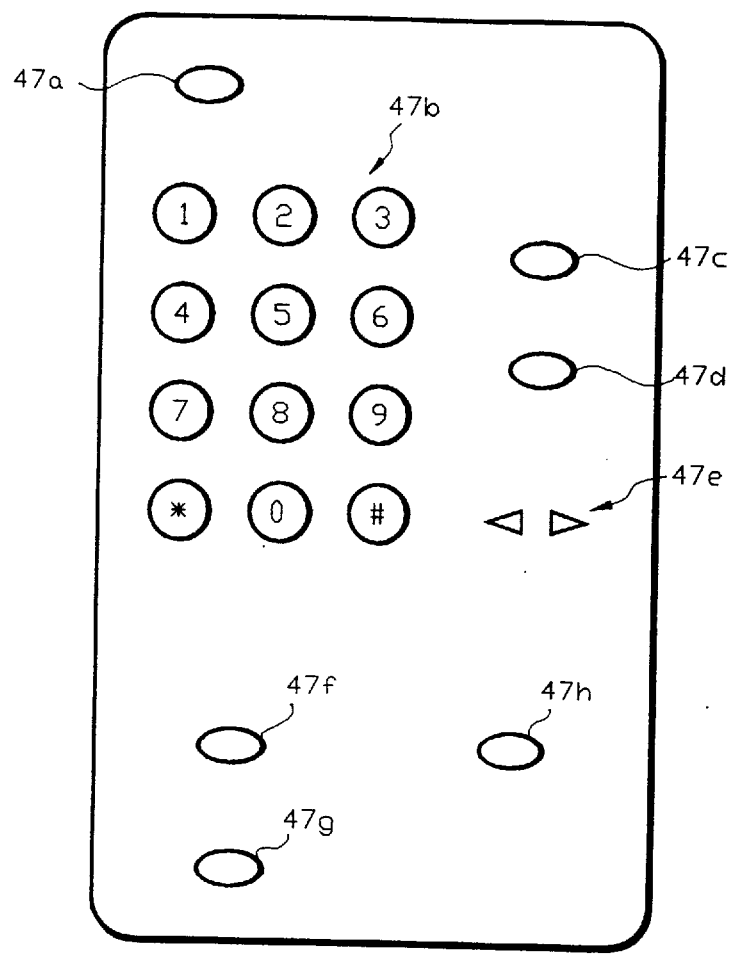

As shown in FIG. 5, key input section 47 includes a power key 47a, a channel key 47b for selecting a desired channel, a playback key 47c for reproducing optical disc 100, a glow speed playback key 47d for slowly reproducing optical disc 100, a forward/ backward high speed search key 47e for forward/backward searching optical disc 100 at a high speed, a specific screen memory key 47f for memorizing a specific screen, a last screen key 47g for selecting a last screen key and a specific screen playback key 47h for reproducing a specific screen. Key input section 47 generates commands for controlling an operating menu.

As shown in FIG. 4, a time information memory 48 writes and stores in second micom 402 time information (e.g. minute, second and sector number start code of an I picture) of a selected screen under the control of first micom 401. FIG. 8 shows an example of data patterns which are stored in time information memory 48 shown In FIG. 4 by operating specific screen memory key 47f.

FIG. 6 is a schematic diagram for explaining the data format of a picture layer bit stream in the decoded MPEG video signal by the CD-ROM decoder shown in PIG. 4. The picture layer bit stream in the decoded MPEG video signal by the CD-ROM decoder has a picture start code (32 bytes), a temporal reference (10 bytes), and a picture coding type (3 bytes). In the picture coding type, I picture, P picture, B picture, and D picture may be seated as 001(2), 010(2), 011(2), and 100(2), respectively.

FIG. 7 is a circuitry diagram for showing an emhndiment of the I picture detection section 49 shown in FIG. 4, Referring to FIG. 7, an I picture detecting setion 49 judges the type of a picture by detecting a start code and a picture coding type data of an I picture among MPEG video signal 491, which is outputted from CD-ROM decoder 44. I picture detecting section 49 includes a first shift register 71, a second shift register 72, a third shift register 73, a first AND gate 74, a second AND gate 75, and a third AND gate 76.

First shift register 71 receives from CD ROM decoder 44 four picture start codes (each of the codes is composed of 8 bytes), a temporal reference (10 bytes) and a picture coding type (3 bytes) from an MPBG video data in the unit of a byte in order, and then outputs the output signal for the picture start code, the output signal for the temporal reference and the output signal for the picture coding type data. Second and third shift registers 72 and 73 are connected with the output terminal of first shift register 71. Second and third shift registers 72 and 73 receive from first shift register 71 the outputs signal for picture stare code and the output signal for temporal reference, and outputs a picture start code detecting signal and a temporal reference detecting signal, respectively. First AND gate 74 logically combines the picture start code detecting signal from second shift register 72 and the temporal reference detecting signal from third shift register 73, and outputs a first picture detecting signal 741. Second AND gate 75 logically combines the picture coding type signals 71111 from first shift register 71 and outputs a second picture detecting signal 751. Third AND gate 76 logically combines first picture detecting signal 741 supplied by first AND gate 74 and second picture detecting signal 751 from second AND gate 75, and outputs the picture coding type detecting signal 761.

Second shift register 72 has a first register 721, a second register 722, a third register 723, and a fourth register 724. First register 721 latches a first code $00 of picture start code, which is inputted to first shift register 71 and is shifted through third shift register 73, fourth register 724, third register 723, and second register 722 of second shift register 72, and outputs the first code to first AND gate 74, as shown in FIG. 6. Second register 722 latches a second code $00 of picture start code, which is inputted to first shift register 71 and is shifted through third shift register 73, fourth register 724, and third register of second shift register 72, and outputs the second code to first register 721 of second shift register 72. Third register 723 latches a third code $01 of picture start code, which is inputted to first shift register 71 and is shifted through third shift register 73 and fourth register 724 of second shift register 72, and outputs the third code to second register 722 of second shift register 72. Fourth register 724 latches a fourth code $00 of the picture start code, which is inputted to first shift register 71 and is shifted through third shift register 73, and outputs the fourth code to third register 723 of second shift register 72.

That is, I picture detecting section 49 detects the picture start codes (each of the codes is composed of a 8 bytes) and the temporal reference (10 bytes), then detects the picture coding type (3 bytes) which is outputted by following them, and thereby discriminates the kind of coding types of optical disc 100.

A control section 40 has a first micom 401 and a second micom 402. Control section 40 temporarily stores time information of an I picture screen signal according to the I picture screen being detected by I picture detecting section 49, and stores in the time information memory 48 the temporarily stored time information of the I picture screen signal according to whether or not a specific screen memory mode is selected. The control section 40 then contols the data reading section 41, based on the stored information of time information memory 48 of whether or not a specific screen playback mode is selected, and controls the operation of MPEG audio signal processing section 45 and MPEC video signal processing section 46. First micom 401 controls optical pickup 412 by controlling servo circuit 413 according to an operation command signal from the key input section 47 shown in FIG. 5, so that optical pickup 412 is moved to a desired sector position on optical disc 100. Second micom 402 receives control signals such as SCR, DTS, and PTS, and outputs a first and second control signal 4021 and 4022 based on the control signals to control the decoding operations of MPEG audio decoder 451 and MPEG video decoder 461. Second micom 402 has a sorlng buffer (not shown) for storing the time information or an I picture screen which is temporarily detected by I picture detection section 49.

Hereinafter, the operation of a method for reproducing a selected screen in a V-CD reproducing system according to an embodiment of the present invention will be described in detail, with reference to FIGS. 9(A) and 9(B).

An optical disk 100 is loaded on V-CD reproducing system 4 by a user. Then, the user pushes a playback key 47c of key input section 47 so that playback command signal 471 is inputted into a first micom 401 of a control section 40. Accordingly, since first micom 401 of control section 40 controls servo circuit 413 of a selected screen data reading section 41, an optical pickup 412 of data reading section 41 reads out data recorded in optical disk 100 in accordance with the MPEG algorithm, and outputs audio/video reading data 4121.

Then, preamplifier 42 amplifies audio/video reading data 4121 and outputs amplified signal 421. Then, DSP 43 processes amplified signal 421 in the form of a serial bit stream and outputs a serial bit streamed signal 431. Then, CD-ROM decoder 44 decodes serial bit streamed signal 431 and separates from it control signals such as SCR, DTS, and PTS (step S1).

Then, I picture detecting section 49 checks whether or not I picture screen data 491, which is the picture start code and the I picture coding type data, is detected from MPEG video data 4412 of MPEG data 441 in step S2.

According to the result of the check in step S2, in step S3, if I picture screen data 491 is detected, then second micom 402 temporarily stores the time information of I picure screen data 491 in a storing buffer (not shown), e.g. the minutes, the second, and the sector number in which the start code is in.

Then, in step S4, first micom 401 judges whether a moment screen memory key 47f is inputted. According to the result of the judgement in step S4, if a specific screen memory key 47f is not pushed, then second micom 402 judges whether or not a specific screen memory mode is selected.

According to the result of the judgement at step S4, if a specific screen memory mode is not selected, second micom 402 erases the temporarily stored time information in the storing buffer (not shown) according to the control signal from first micom 401.

On the other hand, if a specific screen memory mode is selected, that is, if the user pushes a specific memory key 47f in order to reproduce and watch a specific screen and the corresponding sound later while reproducing the V-CD, then first micom 401 recognizes the inputted signal from specific memory key 47f and transmits it to second micom 402. Then, second micom 402 reads the time information of the I picture screen which is temporarily stored sequentially in the storing buffer (not shown) and stores the pointed time information In time information memory 48 as a pointer [0], a pointer [1], . . . a pointer [N], and so on (step S5), as shown in FIG. 8.

Then, in step S6, first micom 401 judges whether or not the data recorded on optical disc 100 are reproduced completely.

According to the result of tle judgement in step S6, if the data recorded in optical disc 100 are not reproduced completely, then control section 40 returns the V-CD reproducing system 4 to step S1 and repeats the operation after step S1, but if the data recorded in optical disc 100 are reproduced completely, in step S7, first micom 401 judges whether or not a specific screen reporducing mode is selected by checking whether or not a specific screen reproducing key 47h is pushed.

According to the result of the judgment in step S7, if the specific screen reproducing mode is selected, in step S8, first micom 401 judges whether a last screen key 47g of key input section 47 is pushed.

According to the result of the judgment in step S8, if the last screen key 47g is pushed, in step S9, second micom 402 reads the last time information data which have been pointed to in time information memory 48. This is then transmitted these to first micom 401.

Then, first micom 401 controls servo circuit 413 of data reading section 41 so that optical pickup 413 may be positioned in the selected sector based on the time information.

Thus, optical pickup 413 is moved to the sector in which the last specific screen selected is positioned under the control of servo circuit 413 at step S10, and the data in the sector are reproduced in step S11. That is, I picture screen data, the following picture screen (B or P picture), and the corresponding sound data are reproduced.

At the same time, in step S12, first micom 401 Judges whether or not the reproducing time of the last specific screen selected has passed for the predetermined time, e.g. 10 seconds.

According to the result of the judgement at step S12, if the predetermined time of 10 seconds has not passed, then control section 40 returns the V-CD reproducing system 4 to step S11 and repeats the operation after step S11. But if 10 seconds have passed, then in step S13, second micom 402 reduces current pointer value by 1 and judges whether or not the next pointer information data are stored in time information memory 48.

According to the result of the judgement at step S13, if the next pointer information data are not stored in time information memory 48, then the operation of reproducing the data is ended. But if the next pointer information data are stored in time information memory, then in step S14, first micom 401 moves optical pickup 412 to the sector position in which the I picture screen data of the next specific screen selected is located on the basis of the next pointer information data by controlling servo circuit 413. Then, control section 40 returns the V-CD reproducing system 4 to step S11 and repeats the operation after step S11.

In other words, if a last selected screen key 47g is pushed, then an I picture screen of the last screen selected corresponding to a last pointer [1], pointer [2], . . . and pointer [N] is displayed on a monitor (not shown) as shown in FIG. 8. Then, a following picture screen, e.g. B or P picture screen, is displayed and the corresponding sound is simultaneously outputted for a predetermined time. Subsequently, as the value of the pointer is increased, a next I picture screen, a picture screen following the next I picture screen, and the corresponding sound are periodically outputted for the predetermined time.

According to the result of the judgement in step S8, if the last screen key 47g is not pushed, then in step S9, second micom 402 reads the time information data which is first pointed to in time information memory 48, this is then transmitted to first micom 401.

Accordingly, first micom 401 controls servo circuit 413 of selected screen data reading section 41 to that optical pickup 412 is positioned in the selected sector based on the time information.

Accordingly, in step S10, optical pickup 413 is moved to the sector in which the first selected specific screen is positioned under the control of servo circuit 413, then the data in the sector is reproduced in step S11. That is, I picture screen data, the following picture screen (B or P picture), and the corresponding sound data are reproduced.

At the same time, in step S12, first micom 401 judges whether or not the reproducing time of the first selected specific screen has passed for the predetermined time, e.g. 10 seconds.

According to the result of the judgment in step S12. if the predetermined time of 10 seconds has not passed, then control section 40 returns V-CD reproducing system 4 to step S11 and repeats the operation after step S11. But if the 10 seconds has passed, then in step S13, second micom 402 increases the current pointer value by 1 and judges whether the next pointer information data are stored in time information memory 48.

According to the result of the judgement at step S13, if the next pointer information data are not stored in time information memory 48, then the operation of reproducing the data is ended. But if the next pointer information data are stored in time information memory, in step S14, first micom 401 moves optical pickup 412 to the sector position in which I picture screen data of the solected next specific screen are located on the basis of the next pointer information data by controlling servo circuit 413. Then, control section 40 returns the V-CD reproducing system 4 to step S11 and repeats the operation after step S11.

In other words, if a last selected screen key 47g is pushed, an I picture screen of the last selected screen corresponding to a last pointer [1], pointer [2], . . . pointer [N] is displayed on a monitor (not shown) as shown in FIG. 8. Then a following picture screen, e.g. B or P picture screen, is displayed and the corresponding sound is outputted for a predetermined time at the same time. Subsequently, as the value of the pointer is increased, a next I picture screen, a picture screen following the next I picture screen, and the corresponding sound are periodically outputted for the predetermined time.

As described above, according to the present invention, since the control section selectively stores the specific screen data while reproducing an optical disc whereon the data are recorded by an MPEG method, if a specific screen playback mode is selected, among the screens and the corresponding sounds which have been reproduced after reproducing the optical disc has been completed, the selectively stored specific screens and the corresponding sound are outputted for a predetermined time periodically. Thus, the user can reproduce a selected specific screen and the corresponding sound again. The present invention also has the additional advantage that editing a selected specific screen and the corresponding sound may be performed.

It is understood that various other modifications will be apparent to and can be readily made by those skilled in the art without departing from the scope and spirit of this invention. Accordingly, it is not intended that the scope or the claims appended thereto be limited to the description as set forth herein, but rather that the claims be constructed as encompassing all the features of the patentable novelty that resides in the present invention, including all the features that would be treated as equivalents thereof by those skilled in the art of the subject which this invention pertains.

What is claimed is:

1. An apparatus for reproducing a selected screen in a video compact disc reproducing system, said apparatus comprising:

a first means for reading audio/video data recorded on a video compact which is loaded in the video compact disc reproducing system disc, the audio/video data including intrapicture video data, bi-directional picture video data and predicted picture video data recorded according to a data compression algorithm such that selected screen data from the audio/video data may be read out based upon a user's selection;

a preamplifier for amplifying the selected screen data from the data reading means to output an amplified signal;

a digital signal processor for processing the amplified signal from the preamplifier in the form of a serial bit stream, to output a serial bit streamed signal;

a CD-ROM decoder for decoding the serial bit streamed signal from the digital signal processor, to sample in the unit of sector, and to separate the sector unit sampled signal into an audio/video data signal and a control signal;

a second means for processing an an audio signal portion of the audio/video signal according to the data compression algorithm to output a sound signal;

a third means for processing an a video signal portion of the audio/video signal according to the data compression algorithm, to output an image signal;

a key input section for generating commands to control an operation menu;

a time information memory for storing time information of the selected specific screen according to whether or not the specific screen is selected by said key input section;

a fourth means for detecting intrapicture video data from the audio/video signal from the CD-ROM decoder, said fourth means including (i) a first shift register for sequentially receiving a picture start code, a temporal reference and a picture coding type from the audio/video signal from said CD-ROM decoder in the unit of a byte, to output an iDutput signal for picture start code, an output signal for temporal reference and an output signal for a picture coding type data, (ii) second and third shift registers connected to the output terminal of said first shift register, for receiving the output signal for a picture start code and the output signal for the temporal reference from said first shift register, and to output a picture start code detecting signal and a temporal reference detecting signal, respectively, (iii) a first logic gate for logically combining the picture start code detecting signal from said second shift register and the temporal reference detecting signal from said third shift register, to output a first picture detecting signal, (iv) a eecond logic gate for logically combining the picture coding type signals from said first shift register, to output a second picture detecting signal, and (v) a third logic gate for logically combining the first picture detecting signal from said first logic gate and the second picture detecting signal from said second logic gate, to output a picture coding type detecting signal; and control means for temporarily storing time information of the intrapicture video data detected by said fourth means, permanently storina the temporarily stored time information of the intrapicture video data detected by said fourth means in said time information memory according to whether or not a specific screen memory mode is selected, controlling said first means based on the stored information of said time information memory according to whether or not a selection of a specific screen playback mode is selected, and controlling the operation of said second means and said third means.

2. The apparatus for reproducing a selected screen in a video compact disc reproducing system as claimed in claim 1, wherein said second shift register of said fourth means includes a first internal register connected to said first shift register for sequentially receiving and outputting first, second, third, and fourth codes of the picture start code from said first shift register; a second internal register for sequentially receiving and outputting the first, second, and third codes of the picture start code from said first internal register; a third internal register for sequentially receiving and outputting the first and second codes of the picture start code from said second register; and a fourth register for receiving the first code of the picture start code from said third register to provide said first logic gate.

3. The apparatus for reproducing a selected screen in a video compact disc reproducing system as claimed in claim 1, wherein said data compression algorithm is the Moving Picture Experts Group 1 algorithm set forth in ISO 11172.

* * * * *